United States Patent
Gräber et al.

(10) Patent No.: US 7,083,199 B2
(45) Date of Patent: Aug. 1, 2006

(54) CHASSIS PART CONSISTING OF FIBER-REINFORCED PLASTICS, EQUIPPED WITH AN INTEGRATED SENSOR

(75) Inventors: Jürgen Gräber, Stemwede-Dielingen (DE); Jochen Kruse, Osnabrück (DE); Joachim Spratte, Osnabrück (DE); Stefan Schönhoff, Osnabrück (DE)

(73) Assignee: ZF Lemförder Metallwaren AG (DE)

( * ) Notice: Subject to any disclaimer, the term of this patent is extended or adjusted under 35 U.S.C. 154(b) by 223 days.

(21) Appl. No.: 10/466,139

(22) PCT Filed: Nov. 6, 2002

(86) PCT No.: PCT/DE02/04121

§ 371 (c)(1),
(2), (4) Date: Jul. 10, 2003

(87) PCT Pub. No.: WO03/039894

PCT Pub. Date: May 15, 2003

(65) Prior Publication Data

US 2004/0046380 A1    Mar. 11, 2004

(30) Foreign Application Priority Data

Nov. 6, 2001    (DE) .............................. 101 53 970

(51) Int. Cl.
*B62D 21/17*    (2006.01)
(52) U.S. Cl. .................... 280/782; 280/5.507
(58) Field of Classification Search ............... 280/782, 280/124.136, 124.171, 5.507, 5.508, 5.513, 280/124.134, 124.135; 73/768, 862.632
See application file for complete search history.

(56) References Cited

U.S. PATENT DOCUMENTS

| | | | |
|---|---|---|---|
| 3,779,071 A | 12/1973 | Thomas, Jr. et al. | |
| 4,411,159 A | 10/1983 | Spear et al. | |
| 4,761,022 A * | 8/1988 | Ohashi et al. | 280/5.504 |
| 4,997,202 A | 3/1991 | Kitagawa et al. | |
| 5,058,918 A * | 10/1991 | Nakaya et al. | 280/124.136 |
| 5,556,081 A * | 9/1996 | Miura et al. | 267/47 |
| 6,006,597 A * | 12/1999 | Miyazaki | 73/118.1 |
| 6,293,561 B1 | 9/2001 | Goetzen et al. | |
| 6,655,199 B1 * | 12/2003 | Smith | 73/118.1 |

FOREIGN PATENT DOCUMENTS

| | | |
|---|---|---|
| DE | 38 39 855 A1 | 5/1990 |
| DE | 196 16 506 C1 | 10/1997 |
| DE | 198 57 394 C2 | 9/2001 |
| EP | 0 213 367 A2 | 3/1987 |
| EP | 0 337 488 A2 | 10/1989 |
| EP | 0 386 748 A1 | 9/1990 |
| EP | 1 132 869 A2 | 9/2001 |
| GB | 2 121 495 A | 12/1983 |
| JP | 59 213509 A | 12/1984 |

* cited by examiner

*Primary Examiner*—David R. Dunn
(74) *Attorney, Agent, or Firm*—McGlew & Tuttle, PC

(57) ABSTRACT

The present invention pertains to a chassis part for connection and force transmission between a vehicle chassis of at least one wheel, consisting of fiber-reinforced plastics or plastic composite systems, preferably for a passenger car or utility vehicle.

The present invention is characterized in that at least one means for measuring forces acting on the chassis parts is integrated in the plastic portions of the chassis parts.

15 Claims, 1 Drawing Sheet

CHASSIS PART CONSISTING OF FIBER-REINFORCED PLASTICS, EQUIPPED WITH AN INTEGRATED SENSOR

FIELD OF THE INVENTION

The present invention pertains to chassis parts for connection and force transmission between a vehicle chassis and at least one wheel, consisting of fiber-reinforced plastics or plastic composite systems, preferably for a passenger car or utility vehicle.

BACKGROUND OF THE INVENTION

Such chassis parts for connection and force transmission between the vehicle chassis and the wheel, also called control arms, are known, in principle. Furthermore, it has been known, e.g., from DE 38 39 855 A1 that lightweight components comprising a connection between structural parts made of metal and plastic can be manufactured. It is problematic in such composite materials that the plastic portions, especially fiber-reinforced plastic components, may undergo brittle fracture under excessively high loads. This means that such parts may abruptly lose their strength and stability under an excessively high load. The use of such composite materials in chassis control arms therefore represents a certain safety hazard, because, on the one hand, extremely high safety requirements are imposed in such environments, but enormous forces may briefly act on the chassis control arms because of unpredictable driving situations or accident situations. However, such composite materials make possible an extremely low-weight and consequently energy-saving design, so that it is desirable for reasons of the efficient manufacture of vehicles to use such composite materials in chassis control arms as well.

SUMMARY OF THE INVENTION

The object of the present invention is therefore to design the above-mentioned chassis parts such that a hazard-free and risk-free use in vehicles is possible.

According to the invention, a chassis part for connection and force transmission between a vehicle chassis and at least one wheel of a motor vehicle is provided consisting of fiber-reinforced plastics or plastic composite systems. At least one device for measuring forces acting on the chassis part is integrated in the plastic portion (fiber-reinforced plastics or plastic composite systems portion) of the chassis part.

The device or devices for measuring the acting forces may be a wire strain gauge, a piezo element, an acceleration sensor or a fiber-optic light guide embedded in the plastic (fiber-reinforced plastics or plastic composite systems) of the chassis part.

The device or devices for measuring the acting forces are arranged such that they can record forces along at least two and preferably three independent axes.

The device or devices for measuring the acting forces may be coupled with an electronic control device for stabilizing the driving and/or the position of the vehicle, especially by action on driving or braking elements (e.g., ESP). The device or devices for measuring the acting forces may be coupled with an electronic documentation device for the measured forces. The electronic documentation device may be integrated within the electronic control device for stabilizing the driving and/or the position of the vehicle. The documentation device may have a warning device to provide an alert as to when preset maximum loads and/or the service life are exceeded. The documentation device may have means for locking the vehicle when preset maximum loads are exceeded.

According to another aspect of the invention, a method of use of a chassis part is provided. A device or devices are integrated in the chassis parts made of plastic or composite materials for measuring forces acting on the chassis parts. The method includes checking the service life of these chassis parts and collecting measured values for electronic control devices, especially for the headlight leveling control and/or for the stabilization of the driving and the position of a vehicle.

The inventors have recognized that it is possible to recognize symptoms of fatigue in time by the continuous monitoring of the forces occurring in these chassis parts and thus to guarantee sufficient safety during the use of composite materials for such chassis parts. Since plastics have a substantially greater elongation than metals at equal strength, these materials are especially suitable for determining the load actually acting on them simply and accurately by means of wire strain gauges or piezo elements. Since integration over time is also possible, it is also possible to detect symptoms of material fatigue that are generated not only by peak loads but also by permanent loads. Moreover, it proved to be especially advantageous that not only are force measurements possible as a result for monitoring the service life of these chassis parts, but the measured force values can also be utilized in electronic control devices, preferably for stabilizing the driving or position of vehicles.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
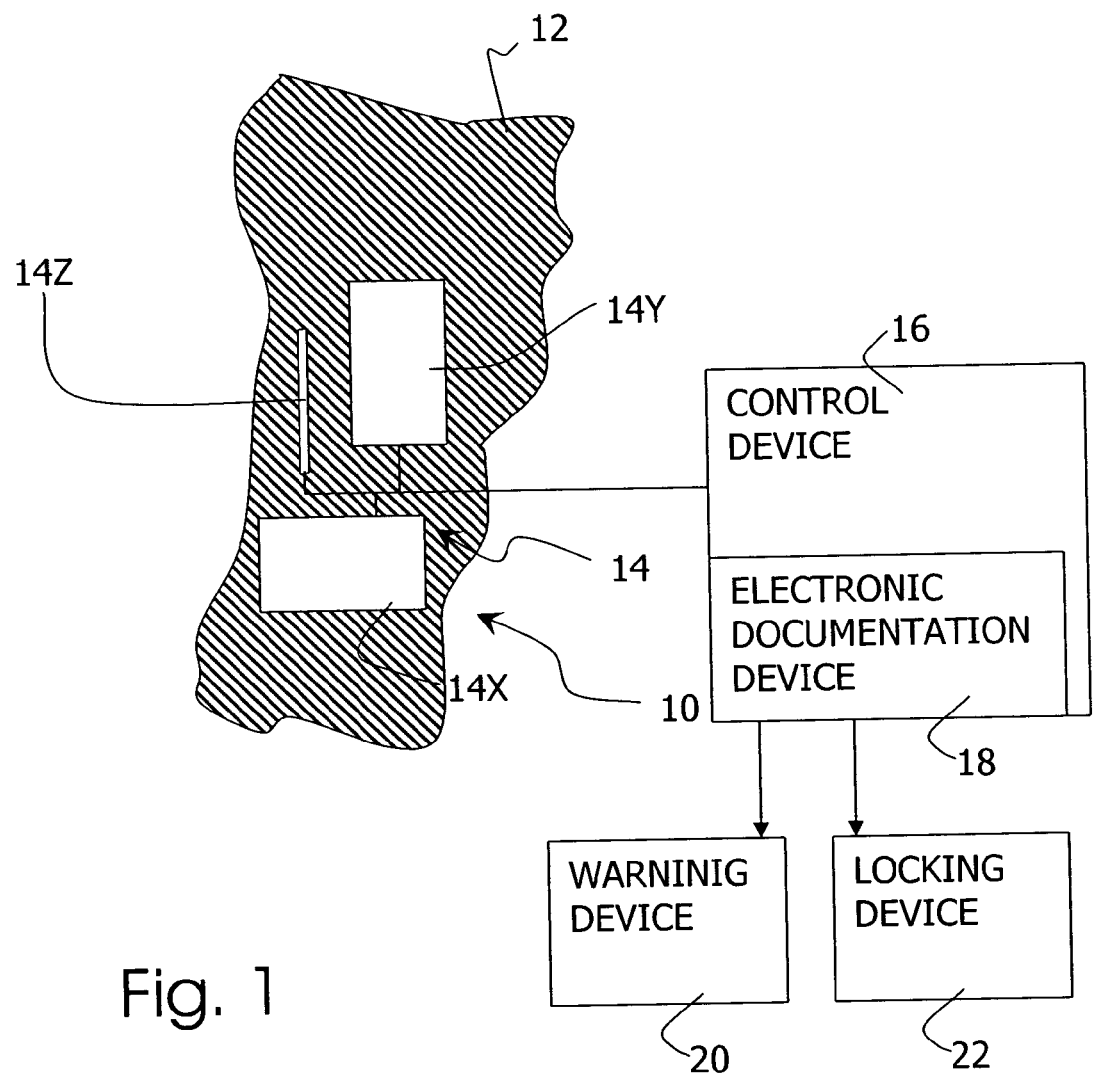
FIG. 1 is a sectional view of a chassis part for connection and force transmission between a vehicle chassis and at least one wheel of a motor vehicle and with a device for measuring forces acting on the chassis part.

Referring to the drawing in particular, corresponding to the idea of the present invention, an improved chassis part 10 is provided for connection and force transmission between a vehicle chassis and at least one wheel. The chassis part 10 consists of fiber-reinforced plastics or plastic composite systems 12. The chassis part 10 is preferably for a passenger car or a utility vehicle. A measuring device 14 or means for measuring forces acting on the chassis part is integrated in the plastic portions of the chassis part 10.

Chassis parts such as chassis part 10 are basically lever constructions, which are also subject to higher loads and especially accelerations than the rest of the vehicle in a jerky and shock-like manner, especially if they are so-called control arms. When these accelerations occur they can be measured with an acceleration sensor. If we now assume that certain accelerations over a defined period of time describe a path traveled, abuse of the control arm, e.g., high-speed travel over a curb, can be inferred. Even though this is not a direct force measurement, it is nevertheless sufficient for identifying states of abuse.

As was mentioned above, measuring device 14 may be one or more wire strain gauges or piezo elements embedded or integrated in the plastic material 12, by means of which the forces occurring and acting on the chassis part 10 can be determined in an electronic manner. These more wire strain gauges or piezo elements may be used in this situation to particular advantage.

In a special design of the chassis part 10 according to the present invention, the means for measuring the acting forces 14 are arranged such that they can record forces along at least two and preferably three independent axes 14X, 14Y and 14Z (see FIG. 1). As a result, it is possible to define the acting forces either in one plane or even in space.

Another manner of measuring the load acting on a force connection strut may be to provide the measuring device 14 as an embed fiber-optic light guide in the plastic material 14 of the chassis part 12, in which case the transmission changes in individual modes as soon as the plastic is bent under load. Thus, the bending stress in the control arm can be inferred from the measurement of frequency band shifts, e.g., the extinction of individual modes.

Corresponding to the basic idea of the present invention, the invention also provides a vehicle with the above-mentioned chassis parts, wherein at least one means for measuring the acting forces is coupled with an electronic control device 16 for stabilizing the travel and/or the position of the vehicle, especially by acting on driving or braking elements. Such control devices may be, e.g., the prior-art ESP (Electronic Stability Program) or even a simple headlight leveling control of the vehicle headlights.

Furthermore, a vehicle according to the present invention may be designed such that at least one means for measuring the acting forces 14 is coupled with an electronic documentation device 18 for the measured forces as part of the control device. This electronic documentation device 18, which comprises, e.g., a simple electronic memory, in which the measured values are stored electronically, now also makes it possible to recognize loads that occur later. Another possibility is to also carry out an evaluation of the measured values, e.g., with respect to the maxima read out, or a more complex calculation of an integrated load and consequently of the life expectancy still present, in the electronic documentation device. This may possibly also be performed combined with a temperature sensor, because there likewise are dependencies between the strength of the particular chassis part and the current body temperature of the chassis part, which should be taken into account especially in case of the use of plastics. The load-bearing capacity of plastics has a substantially stronger temperature dependence than metals.

It is especially advantageous in the sense of the idea of the present invention if the electronic documentation device 18 is integrated in the electronic control device 18 for stabilizing the driving and/or the position of the vehicle. This leads to the possibility of having to calculate the currently occurring forces only once and to use them at the same time for the life expectancy, on the one hand, and for stabilizing the driving and/or the position of the vehicle, on the other hand.

Since information is obtained on the durability of the chassis part based on the knowledge of the loads on the corresponding chassis part 10, it may, furthermore, be advantageous to provide means for warning 20 when preset maximum loads are exceeded and/or a maximum service life has been reached. The measured data are consequently used for two applications at the same time. This results in a synergistic effect due to the elimination of the need for additional sensors for controlling the overload on the control arm or for the determination of the chassis parameters for an electronic drive or position stabilization.

In a continuation of this idea of the present invention, the inventors propose, furthermore, that the documentation device also have means for locking 22 to lock the vehicle when the above-mentioned preset maximum loads or the maximum service life of an essential chassis part are exceeded.

Due to the outfit of chassis parts according to the present invention, it is now also possible to manufacture control arms that are relevant for safety from fiber-reinforced plastics and to use them without safety hazards. If the control arms are manufactured according to an injection molding process or an RTM-like process (RTM=Resin Transfer Molding), the integration of prefabricated sensors 14 as inserts can be accomplished very easily. Control arms from other materials or material composite systems, which have a high local elongation due to their design, are suitable as well. Sensors 14 can be integrated in this case in the control arm in a simple manner in appropriate areas, e.g., where high local loads occur. The sensors may assume two functions, namely, they may be used, on the one hand, for the continuous measurement of the forces and consequently for providing data for an electronic chassis control, and, on the other hand, for monitoring to show whether overloads that could damage the control arm itself occur.

The information that makes possible the diagnosis of the state of the chassis is thus made available by the process described. In particular, such a diagnosis may be meaningful after accidents, in which, e.g., no visible damage can be recognized on chassis parts, but it may be assumed based on the forces measured that structural damage must have occurred inside such parts.

While specific embodiments of the invention have been shown and described in detail to illustrate the application of the principles of the invention, it will be understood that the invention may be embodied otherwise without departing from such principles.

The invention claimed is:

1. A chassis part for connection and force transmission between a vehicle chassis and at least one wheel of a motor vehicle, the chassis part comprising:
   a plastic portion consisting essentially of fiber-reinforced plastics or plastic composite systems defining a control arm;
   at least one measuring means for measuring forces acting on the chassis part, said measuring means being integrated in the plastic portion of the chassis part;
   an electronic documentation device wherein said measuring means is coupled with said electronic documentation device for receiving the measured forces; and
   a temperature sensor wherein coupling said measuring device with said electronic documentation device for the measured forces includes evaluating the measured values in the electronic documentation device based on the temperature sensed by the temperature sensor, further wherein the control arm consists of fiber-reinforced plastics or plastic composite systems.

2. A chassis part in accordance with claim 1 above, wherein at least one means for measuring the acting forces is a wire strain gauge.

3. A chassis part in accordance claim 1, wherein the means for measuring the acting forces are arranged such that they can record forces along at least two-axes.

4. A chassis part in accordance with claim 1, wherein the means for measuring the acting forces is arranged so as to record forces along at least three independent axes.

5. A chassis part according to claim 1, wherein the control arm consists of fiber-reinforced plastics.

6. A chassis part in accordance with claim 1 above, wherein at least one means for measuring the acting forces is a piezo element.

7. A chassis part in accordance with claim 1 above, wherein at least one means for measuring the acting forces is an acceleration sensor.

8. A chassis part in accordance with claim 1 above, wherein at least one means for measuring the acting forces is a fiber-optic light guide embedded in the plastic of the chassis part.

9. A vehicle with a chassis part, the vehicle comprising:
a chassis part control arm with a plastic portion consisting essentially of fiber-reinforced plastics or plastic composite systems and at least one measuring means for measuring forces acting on the chassis part, said measuring means being integrated in the plastic portion of the chassis part; and
an electronic control device for stabilizing the driving and/or the position of the vehicle by action on driving or braking elements, said electronic control device being coupled to said measuring means;
an electronic documentation device wherein said measuring means is coupled with said electronic documentation device for the measured forces; and
a temperature sensor wherein coupling said measuring means with said electronic documentation device for the measured forces includes evaluating the measured values in the electronic documentation device based on the temperature sensed by the temperature sensor.

10. A vehicle in accordance with claim 9, wherein the electronic documentation device is integrated within said electronic control device for stabilizing the driving and/or the position of the vehicle.

11. A vehicle in accordance with claim 9, wherein the documentation device has means for warning when preset maximum loads and/or the service life of said chassis part are exceeded.

12. A vehicle in accordance with claim 9, wherein the documentation device has means for locking the vehicle when preset maximum loads are exceeded.

13. A method of using a chassis part, the method comprising:
providing the chassis part as a control arm part made of plastic or composite materials with an integrated measuring device for measuring forces acting on the chassis part;
measuring forces acting on the control arm part using the integrated measuring device
providing a temperature sensor for temperature measurement in the region of the control arm;
providing an electronic documentation device;
coupling the measuring device with the electronic documentation device for the measured forces; and
evaluating the measured values in the electronic documentation device based on the temperature sensed by the temperature sensor.

14. A method according to claim 13, further comprising:
checking the service life of these chassis part based on the measured forces.

15. A method according to claim 13, further comprising:
collecting measured values and providing the values to an electronic control device for one of headlight leveling control and for the stabilization of the driving and the position of a vehicle.

* * * * *